United States Patent
Ito et al.

(10) Patent No.: US 6,547,288 B1
(45) Date of Patent: Apr. 15, 2003

(54) COVER OF IMAGE FORMING DEVICE

(75) Inventors: Shingo Ito, Nagoya (JP); Yoshikatsu Kameyama, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/244,337

(22) Filed: Feb. 10, 1999

(30) Foreign Application Priority Data

Feb. 13, 1998 (JP) .......................... 10-031768
Feb. 17, 1998 (JP) .......................... 10-034737

(51) Int. Cl.[7] .......................... E05C 19/06; E05C 17/33
(52) U.S. Cl. .......................... 292/10
(58) Field of Search .................. 74/527, 535, 531, 74/532; 292/4, 10, 53, 240, 267, 271

(56) References Cited

U.S. PATENT DOCUMENTS

| | | | | |
|---|---|---|---|---|
| 1,615,035 A | * | 1/1927 | Rasmussen | 296/90 |
| 2,231,885 A | * | 2/1941 | Christy | 454/89 |
| 5,041,872 A | * | 8/1991 | Nukaya et al. | 399/107 |
| 5,145,407 A | * | 9/1992 | Obata et al. | 439/567 |
| 5,445,046 A | * | 8/1995 | Kataumi et al. | 74/527 |
| 5,598,740 A | * | 2/1997 | Itoh | 74/473.23 |
| 5,991,570 A | * | 11/1999 | Haga et al. | 399/114 |

FOREIGN PATENT DOCUMENTS

| | | | |
|---|---|---|---|
| JP | U-7-2345 | 1/1995 | |
| JP | U-8-878 | 5/1996 | |
| JP | A-8-177297 | 9/1996 | |
| JP | 11-229697 | * 8/1998 | .......... E05C/17/38 |

* cited by examiner

Primary Examiner—Donald P. Walsh
Assistant Examiner—Kenneth W Bower
(74) Attorney, Agent, or Firm—Oliff & Berridge, PLC

(57) ABSTRACT

An upper case 5 is pivotable with respect to a case 2 by attachment with two frames 37. A sheet-supply tray 6 is pivotably mounted on the upper case 5. The sheet-supply tray 6 has a pair of left and right guides 35, 35 at a position near a sheet-supply port 13. The guides 35, 35 have a pair of separation ribs 42, 42 that define therebelow a sheet-supply pathway and therebelow a sheet discharge pathway. A synthetic resin hollow frame 40 with an integral slide rib 41 is fixed to the case 2. The slide rib 41 is formed with an outwardly curving surface 41a that is eccentric with an imaginary circle around a pivot shaft 38 of the upper case 5, wherein the free end of the slide rib 41 is farther from the shaft 38 than the fixed end. A horizontally protruding pin is fixed on one of the frames 37, and so pivots following the imaginary circle around the shaft 38. When the upper case 5 is pivoted wide open, the pin 39 pressingly slides against the outwardly curving surface 41a of the slide rib 41, until the pin 39 reaches near the free end of the outwardly curving surface 41a, where the pin 39 is held in a desired opened position.

7 Claims, 7 Drawing Sheets

LEFT ←→ RIGHT

COVER OF IMAGE FORMING DEVICE

BACKGROUND OF THE INVENTION

1. Field of the Invention

The present invention relates to a cover of an image forming device such as a printer, a facsimile machine, and a copy machine.

2. Description of the Related Art

Japanese Utility Model-Application Publication No. HEI-7-2345 discloses a document scanning unit with a tray serving both as a supply tray for supplying documents to a document retrieving portion, and as a document-discharge tray for receiving the documents after images are retrieved.

The device case is formed with a sheet-supply port through which documents are supplied into the device, and sheet-discharge port through which documents are discharged out of the case. The sheet-supply port and the sheet-discharge port are formed in the rear and the upper sides of the case, respectively, so as to sandwich therebetween the rear upper portion of the case. The tray is mounted at the rear surface of the case and includes a slanting surface that slants downward toward the sheet-supply port. A guide is provided on one edge of the upper surface of the tray. The guide is for regulating size of documents placed on the tray.

The guide includes a regulating rib extending in a direction substantially parallel to the surface of documents stacked on the tray. Documents to be supplied into the document retrieval device are stacked on the tray below the rib and documents are discharged out of the discharge port on top of the rib. In this way, the rib separates sheets to be supplied from sheets that have been discharged.

Japanese Patent-Application Publication (Kokai) No. HEI-8-177297 discloses a mechanism for pivoting open a cover of a printer and slowly stopping the cover when the cover opens to a desired amount. The disclosed mechanism requires only a slight force to move the cover when first pivoting the cover open, but a larger force as the cover opens wide.

The cover is pivotably mounted on a shaft that is fixed to the device case. A coil spring is compressingly wound around the periphery of the shaft. When the cover is pivoted open, a free end of the coil spring engages with the cover so that the coil spring unwinds around the fixed shaft in a direction for loosening the coil spring. Force required to move the cover increases the more the cover is opened, because force required to unwind the coil spring increases.

Japanese Utility Model-Application Publication No. HEI-8-878 discloses a mechanism for stopping a cover at a desired opened position. The mechanism includes a cover, a rod, and a stop member. The rear edge of the cover is pivotably connected to a case so that the cover can be opened up with respect to the case by lifting up the front edge of the case. The stop member is fixed to the cover. The rod is also pivotably connected to the case and extends through the stop member on the cover. A friction member is supported in the stop member. The friction member is designed to move along the rod without generating any friction resistance while the cover is being opened, but to engage with the rod by friction while the cover is being closed.

SUMMARY OF THE INVENTION

However, with the configuration disclosed in Japanese Utility Model-Application Publication No. HEI-7-2345, supplied documents and discharged documents travel in opposite directions. Because the guide is provided only at one edge of the tray, discharged and supplied documents will rub against each other at the edge without the guide. There is a potential problem in that documents that have already scanned and then discharged from the retrieval device will get drawn back into the retrieval device by movement of documents being supplied. These documents will again be supplied back to the retrieval device and rescanned so that sheets that have been processed can be mixed in with sheets that have not yet been processed. Also, when discharged documents reenter the sheet-supply port in this manner, they can enter the sheet-supply port at an angle and cause paper jams, or can be torn or otherwise damaged.

The mechanism described in Japanese Patent-Application Publication (Kokai) No. HEI-8-177297 requires the coil spring to be wound around the fixed shaft. Therefore, assembly of the mechanism is extremely troublesome. When the cover is heavy, the coil spring must be formed from a thick diameter wire or other thick material, and also must be lengthened. As a result, a fairly large area must be secured to accommodate the lengthened and thickened coil spring around the fixed shaft. Therefore, the mechanism for opening and closing the cover must be relatively large.

The mechanism described in Japanese Utility Model-Application Publication No. HEI-8-878 requires a long rod extending from the case to the cover. Also, the rod pivots in a fan shaped motion in association with opening and closing of the cover. Other components can not be disposed along the pivot orbit of the rod. In other words, the mechanism for opening and closing the cover takes up a lot of space. Also, troublesome operations are required to attach the components of the mechanism together.

It is an objective of the present invention to overcome the above-described problems and to provide a device for supplying and discharging sheets in an image forming device wherein supplied sheets and discharged sheets are not supplied at a slant and do not get mixed up, and to provide a mechanism for opening and closing a cover with a compact shape that can be assembled with easy operations.

One aspect of the present invention relates to devices that supply and discharge sheets to almost the same location following a U-turn pathway. According to this aspect of the present invention a sheet supply/discharge configuration includes a case and a sheet-supply tray. The case is formed with a sheet-supply port and a sheet-discharge port extending substantially in parallel with each other.

The sheet-supply tray includes an upper surface, a pair of guides, and a pair of separation ribs. The upper surface slants downward toward the sheet-supply port and has a lower edge disposed with the sheet-supply port interposed between the lower edge and the sheet-discharge port. The pair of guides is disposed in an upright posture with respect to the upper surface. The guides guide sheets stacked on the upper surface toward the sheet-supply port. The pair of separation ribs are provided one to each of the guides. The separation ribs together define thereabove a sheet-discharge pathway and therebelow a sheet-supply pathway.

With this configuration, sheets can be supplied from and discharged to almost same place without the two types of sheets getting mixed up. That is, even if the recording sheets are supplied through the sheet-supply pathway in a direction completely opposite from a direction in which the recording sheets are discharged through the sheet-discharge pathway, the separation ribs prevent sheets being supplied and sheets being discharged or that have been supplied and discharged from touching each other. Therefore, discharged sheets can be prevented from being drawn back into the sheet-supply pathway by sheets being supplied. As a result, the discharged sheets can be prevented from being printed on for a second time. Also, paper jams can be prevented. Because this function is achieved by providing only a pair of guides in the upper surface of the sheet-supply tray, the configuration is extremely simple.

It is desirable that the sheet-supply port and the sheet-discharge port be formed in an upper surface of the case. In this case, it is desirable that a regulating protrusion be formed on the upper surface of the case at a position between the sheet-supply port and the sheet-discharge port. The regulating protrusion guides sheets from the discharge port to travel above the separation ribs of the guides.

With this configuration, the restriction protrusion prevents discharged recording sheets from entering the sheet-supply port below the pair of guides, as the discharged sheets pass over the upper surface of the case. As a result, discharged recording sheets can be more reliably prevented from entering into the sheet-supply side.

It is also desirable that each separation rib has a slanted surface slanting nearer the upper surface with increasing proximity to the sheet-supply port. Because the separation ribs are higher at the side through which sheets are introduced in between the guides and into the sheet-supply pathway, a plurality of recording sheets can be more easily inserted in between the guides. Additionally, because the recording sheets are discharged by sliding upward across the upper surface of the separation ribs, the front edge of the recording sheets are more greatly separated from the supply pathway with increasing distance from the sheet-supply port, that is, with increasing proximity to the side through which sheets are introduced into the sheet-supply pathway. Therefore, recording sheets that move downward when supplied are less likely to contact discharged sheets or sheets that are being discharged. As a result, the discharged sheets are less likely to be drawn into the sheet-supply port by sheets being supplied.

It is further desirable the sheet-supply tray be pivotably mounted on the case and pivotable into a posture covering at least the sheet-supply port. In this case, it is further desirable that an extension hopper be pivotally mounted on the upper surface of the sheet-supply tray so as to be pivotable between a reclining posture and an extended posture. In the reclining posture, a substantial portion of the extension hopper is adjacent to the upper surface. IN the extended posture, a substantial portion of the extension hopper extends off upper surface.

With this configuration, the sheet-supply tray is pivoted open with respect to the case, and then the flat wire shaped extension hopper is pivoted so that its front end sticks out from the free end of the sheet-supply tray. Even if long sheets are stacked on the inner surface of the sheet-supply tray across the extension hopper, the edge of sheets sticking over the free end of the sheet-supply tray do not bend or crease. Furthermore, the end portions of recording sheets sticking over the end of the sheet-supply tray do not hang down so that sheet supply can be smoothly performed and distorted printing can be prevented.

When the extension hopper is pivoted from its extended posture between the guides to its reclining or folded condition, the extension hopper will not get in the way when the sheet-supply tray covers the case. Also, the facsimile device can be made more compact.

A second aspect of the present invention relates to a mechanism for opening and closing a cover or other pivotable member of an office automation device, such as a printer, a fax machine, or a copy machine, wherein the cover is pivotable around an imaginary pivot line with respect to a case or other fixed member of the device. This aspect more particularly relates to configuration enabling the cover to smoothly open to a large angle with respect to the fixed member so that the cover opens quietly and without any shock.

According to the second aspect of the present invention, the mechanism is provided to a fixed member and to a pivotable member. That is, the pivotable member is pivotably attached to the fixed member so as to be pivotable about an imaginary pivot line with respect to the fixed member.

The mechanism includes a pin and resiliently deformable slide rib. The pin and the slide rib are provided to different ones of the fixed member and the pivotable member. That is the pin is provided to one of the fixed member and the pivotable member, and slide rib is provided to another of the fixed member and the pivotable member.

The pin protrudes in a direction substantially parallel with the imaginary pivot line. It is also axially centered on an imaginary circle that is centered on the imaginary pivot line. The slide rib has an outwardly-curved surface eccentric with the imaginary circle.

The one of the slide rib and the pin that is provided to the pivotable member is disposed at a position so as to follow the imaginary circle when the pivotable member is pivoted open away from the fixed member. As a result, the outwardly-curved surface and the pin pressingly slide against each other.

With this configuration, when pivotable member pivots open with respect to the fixed member, the pin and the outwardly curving surface will approach each other because, one the one hand, the pin is disposed on the imaginary circle around the imaginary pivot line of the pivotable member and, on the other hand, the outwardly curving surface of the pivot rib is eccentric with respect to the imaginary pivot line.

Said differently, the outwardly curving surface is formed so that one end is nearer the imaginary pivot line than the other end. As a result, when one of the pin and the slide rib moves by pivoting movement of the pivoting member, so that the pin approaches the distant end of the outwardly curving surface, the slide rib resiliently bends in a radial direction with respect to the imaginary pivot line. This bending deformation generates resistance force between the pin and the slide rib so that the moving one of the pin and the slide rib can be stopped and maintained in place with extreme ease. When the pivotable member is massive and heavy, the resistance force against the pin can be easily increased without changing shape or dimensions of the slide rib or the pin itself. That is, to increase the resistance force, the slide rib and the pin need merely be positioned so that the slide rib and the pin abut where the curved surface of the slide rib is further from the imaginary pivot line, that is, in the radial direction from the line. The mechanism having this configuration is compact and does not require large outer dimensions.

It is desirable that when the slide rib has a fixed end and a free end on opposite sides of the outwardly-curved surface, then in this case the outwardly-curved surface slope further away from the imaginary pivot line with increasing proximity to the free end.

By forming the slide rib with one end fixed and the other end free, resistance force for holding the pin in place can be smoothly changed by moving the pin along the slide rib from the fixed end to the free end of the slid rib. As a result, operations for opening and closing the pivotable member can be smoothly performed.

It is desirable that the fixed end of the slide rib be formed integrally with an inner diameter portion of a resin hollow frame. By forming the slide rib integrally to the inner surface of the hollow frame, the slide rib can be positioned by merely fixing a portion of the hollow frame to the fixed member. As a result, operations for attaching the slide rib can be easily performed. Further, because the pivot orbit of the pin is restricted to within the hollow frame, objects can be easily prevented from becoming sandwiched between the slide rib and the pin.

It is desirable that the imaginary pivot line extend in a horizontal direction. Also, it is desirable that the pin be provided to protrude from the pivotable member. Further, it is desirable that the hollow tube frame with the slide rib be fixed to the fixed member. By forming the small pin on the pivotable member, the region where other components can not be disposed because of the pivotable orbit of the pin is reduced so that the device overall can be more compact.

According to a third aspect of the present invention device that uses sheets, such as for printing fax data or print data, includes a lower case, an upper case, a pin, a resiliently deformable slide rib, and a sheet-supply tray.

The upper case is pivotably attached to the lower case so as to be pivotable about an imaginary pivot line with respect to the lower case. The upper case is formed with a sheet-supply port and a sheet-discharge port extending substantially in parallel with each other.

The pin is provided to one of the lower case and the upper case. The pin protrudes in a direction substantially parallel with the imaginary pivot line and is also axially centered on an imaginary circle that is centered on the imaginary pivot line.

The slide rib is provided to another of the lower case and the upper case. The slide rib has an outwardly-curved surface eccentric with the imaginary circle. The slide rib or the pin, whichever is provided to the upper case, is positioned so as to follow the imaginary circle when the upper case is pivoted open. As a result, the outwardly-curved surface and the pin pressingly slide against each other.

The sheet-supply tray is disposed on the upper case at a position to sandwich the sheet-supply port between the sheet-supply tray and the sheet-discharge port. The sheet-supply tray has an upper surface slanting downward toward the sheet-supply port; a pair of guides for guiding sheets stacked on the upper surface toward the sheet-supply port; and a pair of separation ribs provided one to each of the guides, the separation ribs together defining therebelow a sheet-supply pathway and thereabove a sheet-discharge pathway.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
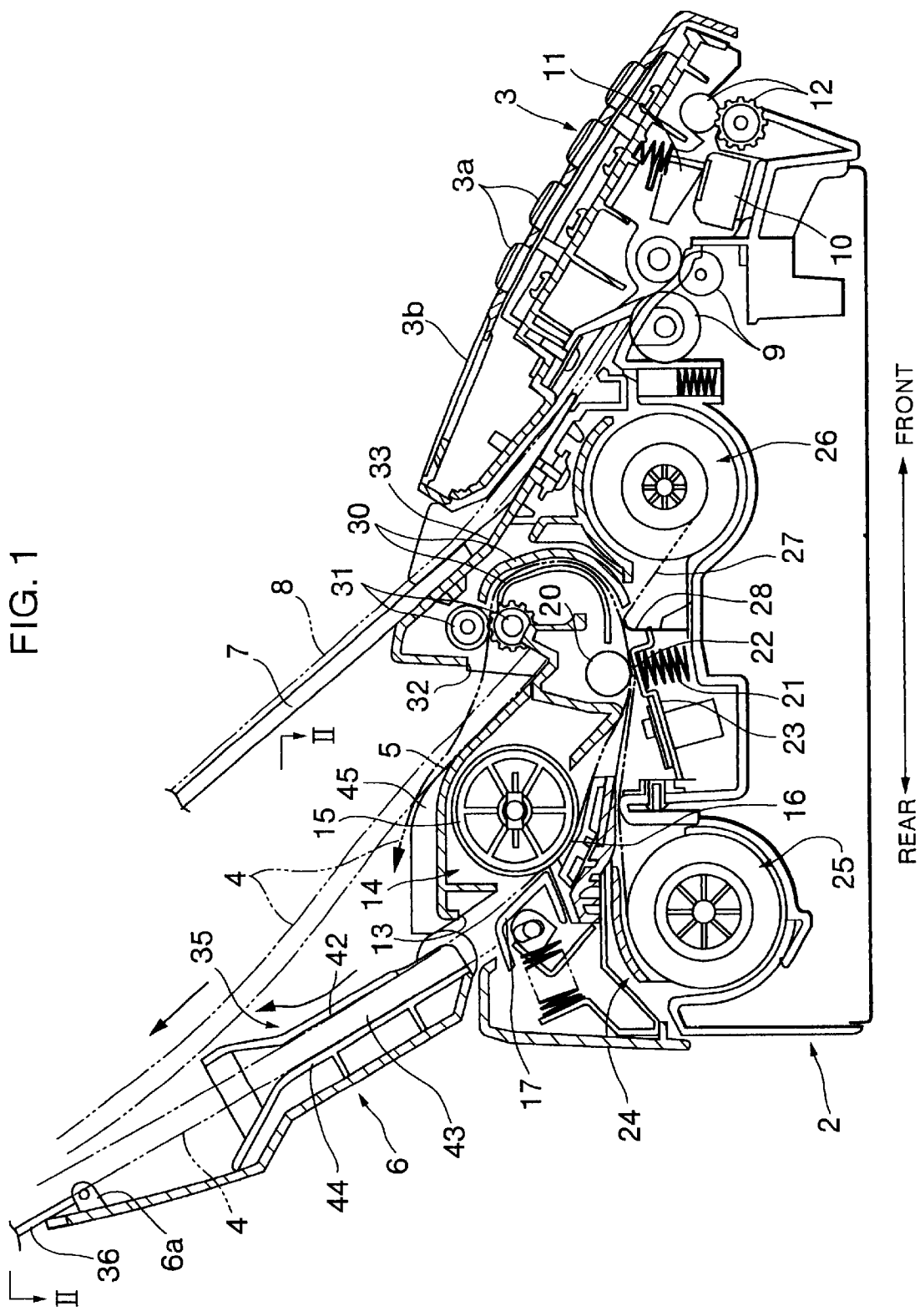
FIG. 1 is a cross-sectional view of a facsimile machine according to an embodiment of the present invention.

A facsimile device 1 according to a preferred embodiment of the present invention will be described while referring to the accompanying drawings wherein like parts and components are designated by the same reference numerals to avoid duplicating description.

First, a brief explanation will be provided for functions performed by the facsimile device 1. The facsimile device 1 includes configuration for performing a normal fax function and also a printer function. When performing the fax function, the facsimile device 1 retrieves image data from a document 8 and transmits the resultant image data as fax data to a remote fax machine over a telephone circuit, or receives fax data transmitted over the telephone circuit from a remote fax machine and forms images accordingly on a recording sheet 4. When performing the printer function, the facsimile device 1 receives print data transmitted over a printer cable or a wireless mechanism, such as infrared mechanism, from a word processor or a personal computer and forms images based on the print data.

The facsimile device 1 includes a lower case 2, an upper case 5, and a sheet-supply tray 6. Although not shown in the drawings, a handset is disposed on one side of the lower case 2. An operation panel 3 is provided to the upper front surface of the lower case 2. The operation panel 3 includes key switches 3a and a liquid crystal display 3b. A pair of feed rollers 9, a contact image scanner (CIS) 10, a document pressing member 11, and a pair of discharge Solo rollers 12 are disposed within the lower case 2 at positions below the operation panel 3. The document pressing member 11 is disposed above a glass surface of the retrieval portion of the contact image scanner 10.

Figure 4:
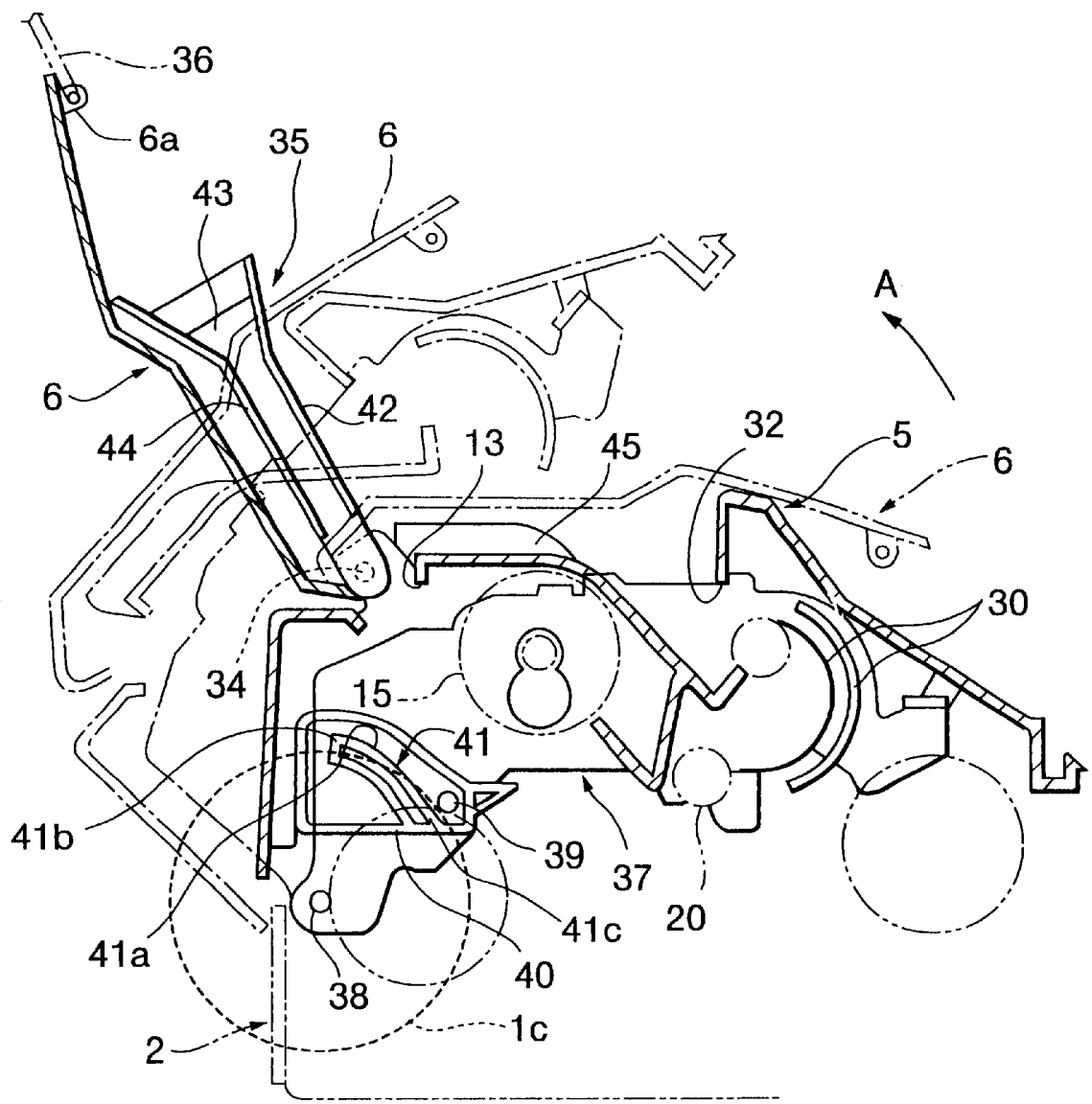
FIG. 4 is a magnified cross-sectional view showing opening and closing movements of a cover of the facsimile machine.

The upper case 5 is formed from a synthetic resin material and, as shown in FIG. 4, is pivotably disposed at the rear portion at the upper surface of the lower case 2. The upper case 5 is formed with a sheet-supply port 13 opened to-a sheet-supply portion 14, a sheet-discharge port 32 opened to a sheet-discharge portion, and an introduction portion 33 opened to contact image scanner 10. In this way, the upper case 5 serves as a cover for the sheet-supply portion 14, the sheet-discharge portion, and the contact image scanner 10. A document tray 7 is detachably mounted on the upper surface of the upper case 5, at a position adjacent the introduction portion 33 and centered in the front and rear directions. The feed rollers 9 are for transporting documents 8 from the document tray 7.

The sheet-supply tray 6 is disposed at the rear edge of the upper case 5 with a slanting posture slanting downward toward the sheet-supply port 13. The sheet-supply tray 6 is for supporting a stack of cut-sheet type recording sheets 4 in an upright and downward slanting posture to facilitate movement of sheets toward the sheet-supply port 13.

As shown in FIG. 1, the sheet-supply portion 14 includes a sheet-supply roller 15, a separation pad 16, and a pressing member 17. The sheet-supply roller 15 is for transporting one sheet 4 at a time from the sheet-supply port 13 and is intermittently rotatable around a horizontally disposed shaft. The pressing member 17 presses recording sheets 4 stacked in the sheet-supply tray 6 against a rear part of the peripheral surface of the sheet-supply roller 15, from a position upstream in the transport direction from the separation pad 16. The separation pad 16 is urged by a spring against the lower peripheral surface of the sheet-supply roller 15.

A print portion is disposed below the sheet-supply portion 14. The print portion includes a roller-shaped platen 20, a print stand 23, and an ink ribbon cartridge 24. The print stand 23 includes a line-print-type thermal head 22 urged toward the lower surface of the platen 20 by a spring 21.

The ink ribbon cartridge 24 is disposed in the rear portion of the lower case 2 and has a ribbon-supply spool 25 and a ribbon take-up spool 26. The ink ribbon cartridge 24 is disposed across the print stand 23 with the ribbon take-up spool 26 disposed in front of the ribbon-supply spool 25. An ink ribbon 27 is wound around the ribbon spools 25, 26 and passes over the upper surface of the thermal head 22 and a tension body 28, which is formed from a plate spring. The ink ribbon 27 passes over the thermal head 22 and the tension body 28 and reaches the lower peripheral surface of the ribbon take-up spool 26. The ink ribbon 27 is formed from a wide resin film. The upper surface of the ink ribbon 27 is covered with ink.

In order to print on recording sheets 4, a recording sheet 4 is brought into confrontation with the upper surface of the ink ribbon 27, and the ink ribbon 27 and the recording sheet 4 are sandwiched in between the platen 20 and the thermal head 22. Thermal elements of the thermal head 22 are energized according to image data to form the image one line at a time on a recording sheet 4.

After the recording sheet 4 has been recorded on by the thermal head 22 of the print portion, the printed on recording sheet 4 is guided through the sheet-discharge portion by a discharge pathway plate 30 to a pair of discharge rollers 31, and discharged out from the sheet-discharge port 32, whereupon they are stacked onto the upper surface of guides 35, 35, which, as will be described later, are used commonly for sheet supply and sheet discharge.

As shown in FIG. 4, the sheet-supply tray 6 is pivotably supported at its base end on a pivot portion 34 near the rear upper edge of the upper case 5. The sheet-supply tray 6 can be pivoted between a closed condition indicated by a two-dot chain line in FIG. 4 and an open condition indicated by a solid line in FIG. 4. When the facsimile device 1 is not being used or when recording sheets 4 are not being printed on, the sheet-supply tray 6 can be pivoted into its closed condition to cover the sheet-supply port 13 and the sheet-discharge port 32 on the upper surface of the upper case 5.

Figure 5A:
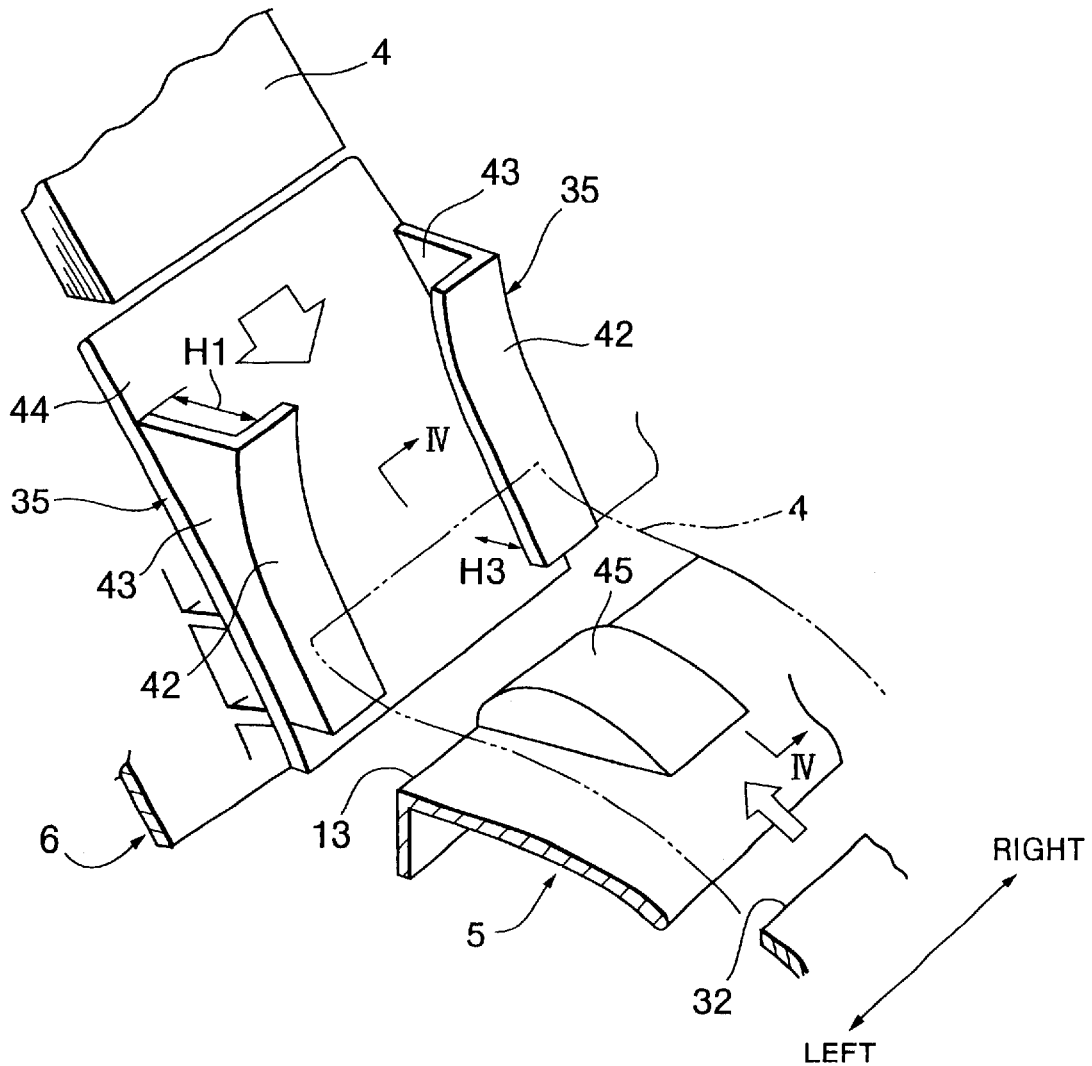
FIG. 5(a) is a perspective view in partial cross-section showing the sheet-supply tray.

As best seen in FIG. 5(a), guides 35, 35 protrude from a bed 44 of the sheet-supply tray 6 at each of left end right sides of the sheet-supply tray 6. As will be described below, the guides 35, 35 serve to guide sheets 4 during both supply and discharge of sheets 4. It should be noted that the bed 44 can be considered to be the inner surface of the sheet-supply tray 6 with respect to the closed condition of the sheet-supply tray 6 or the upper surface of the sheet-supply tray 6 with respect to the open condition of the sheet-supply tray 6.

Figure 5B:
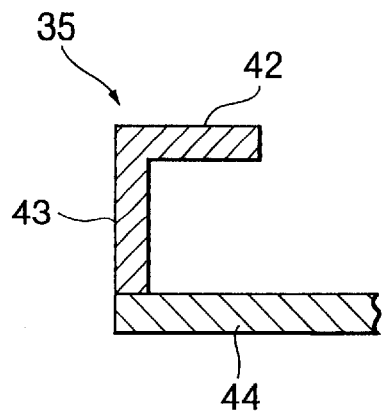
FIG. 5(b) is a cross-sectional view showing a C-shape formed by components of the sheet-supply tray.

Each guide 35, 35 includes a vertical rib 43 and a separation rib 42. The vertical ribs 43 both extend from front to rear substantially following a transport direction of the sheets 4. The separation ribs 42 extend toward each other from an upper edge of the corresponding vertical rib 43. With this configuration, each guide 35 forms a substantial C shape in cross section with the bed 44 as shown in FIG. 5(b).

The guides 35, 35 and the bed 44 serve as a hopper portion for supporting the stack of sheets 4 in a downward slanting upright condition. The space defined by the vertical ribs 43, 43 and the separation ribs 42, 42, that is, the space below the lower surface of the separation ribs 42, forms a sheet-supply pathway through which recording sheets 4 are supplied into the facsimile device 1. The left and right vertical ribs 43, 43 restrict leftward and rightward movement of the sheets 4 by abutment left and right edges of the sheets 4. Therefore, the guides 35, 35 guide the sheets 4 to move straight when the sheets 4 are supplied into the facsimile device 1.

The guides 35 also serve to guide and support sheets 4 when they are discharged through the sheet-discharge port 32. The separation ribs 42, 42 extend to the front and rear in a substantially parallel condition with the transport direction of discharged sheets 4. In this way, the upper surface of the separation ribs 42, 42 form a discharge pathway, therefore preventing the recording sheets 4 discharged from the sheet-discharge port 32 from getting mixed in with recording sheets 4 to be supplied.

Figure 6:
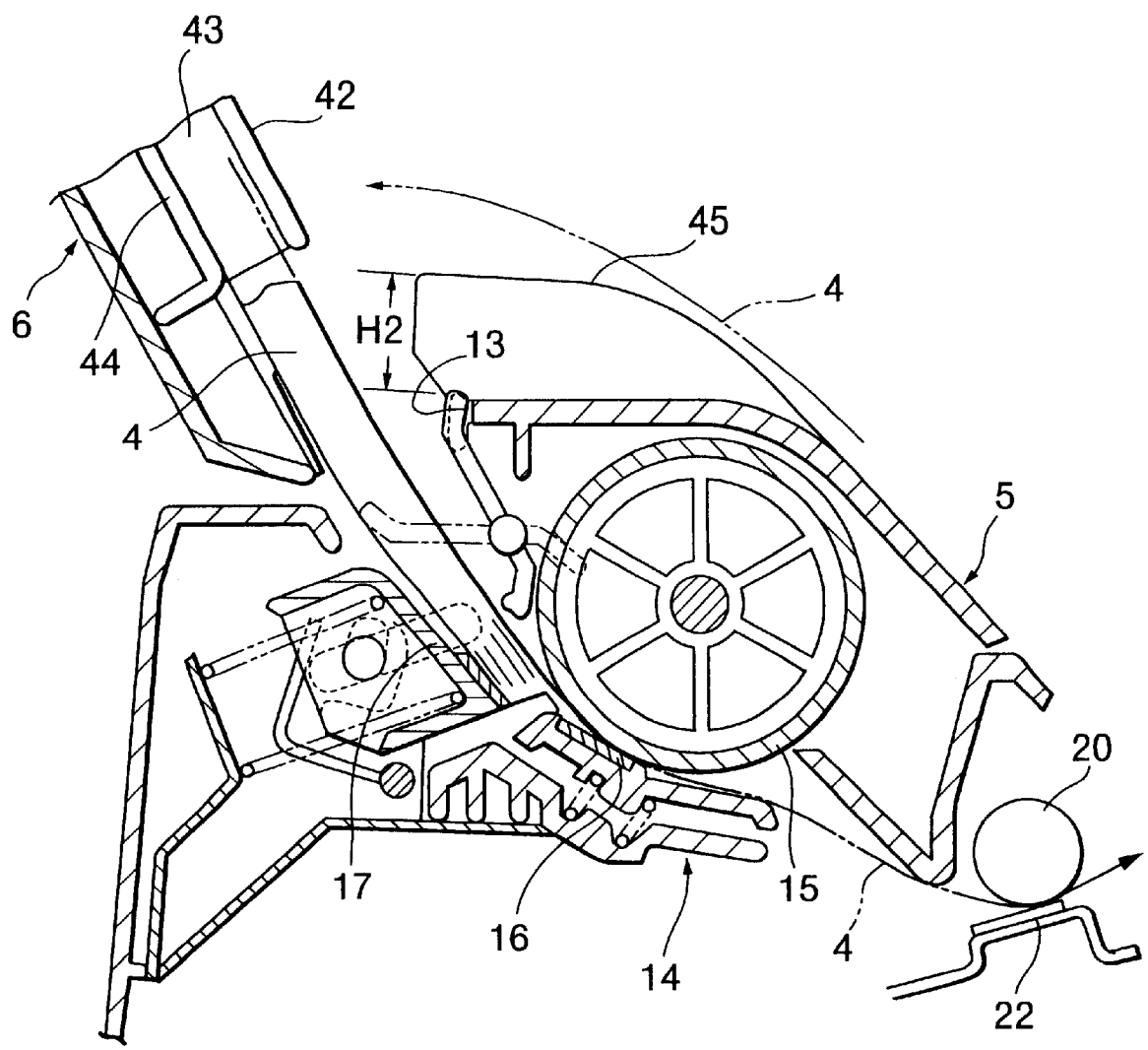
FIG. 6 is a magnified cross-sectional view showing essential components for sheet feed.

A restriction protrusion 45 is formed on the upper surface of the upper case 5 at a position between the sheet-discharge port 32 and the sheet-supply port 13. As shown in FIG. 6, the restriction protrusion 45 gradually increases in height with distance from the sheet-discharge port 32, to a maximum height H2 where the restriction protrusion 45 is adjacent to the sheet-supply port 13. The height H2 of the restriction protrusion 45 is set to substantially equal to or higher than the height level of the lower edges (i.e., the edges nearest to the sheet-supply port 13) of the separation rib 42. The restriction protrusion 45 prevents sheets 4 from either bending downward when discharged from the sheet-discharge port 32. As a result, discharged sheets 4 can be reliably prevented from bending toward the sheet transport pathway below the lower edge of the separation rib 42, or from directly entering into the sheet-supply port 13.

As shown in FIG. 5(a), the separation ribs 42, 42 have a slanting form, wherein the separation ribs 42, 42 are separated from the bed 44 by a greater height H1 at the end where recording sheets 4 are introduced, that is, at the end upstream with respect to the sheet-supply direction, than a height H3 at the end where the recording sheets 4 are supplied to the sheet-supply port 13. This slanting form facilitates insertion of a plurality of recording sheets 4 between the guides 35, 35. Also, the slant of the separation ribs 42, 42 prevents the front edges of discharged recording sheets 4, that is, sheets that have been discharged from the sheet-discharge port 32 or are being discharged out from the sheet-discharge port 32 and are sliding upward across the upper surface of the separation ribs 42, 42, from contacting recording sheets 4 that are moving downward toward the sheet-supply port 13 when supplied below the separation ribs 42, 42. As a result, recording sheets 4 that have been or are being discharged will not be dragged into the sheet-supply port 13 by movement of supplied sheets and so will not again be supplied into the facsimile device 1.

According to the present embodiment, the guides 35, 35 are fixed separated from each other by the width of an A4 size recording sheet. However, either one or both of the guides 35, 35 can be configured to be movable so that distance between the guides 35, 35 can be increased or decreased in accordance with width of the recording sheets 4.

A flat extension hopper 36 is provided for supporting the rear edge of elongated recording sheets 4. The extension hopper 36 is formed from a wire which is bent in a substantially C-shape in plan view. The extension hopper 36 has base ends 36a, 36a at left and right sides. The base ends 36a, 36a are pivotably supported in left and right brackets 6a, 6a which protrude from the inner surface near the free edge of the sheet-supply tray 6. In this way, the base ends 36a, 36a are pivotably supported at the inner surface of the sheet-supply tray 6.

The extension hopper 36 can be selectively pivoted between a folded-up posture and an extended posture. The folded-up posture is indicated by a two-dot chain line in FIG. 2 and by a solid line in FIG. 3. To put the extension hopper 36 into its folded-up posture, the cross-bar of the extension hopper 36 is pivoted toward and into contact with the surface of the sheet-supply tray 6 so as to be in a substantially parallel condition with the pivot portion 34.

Figure 2:
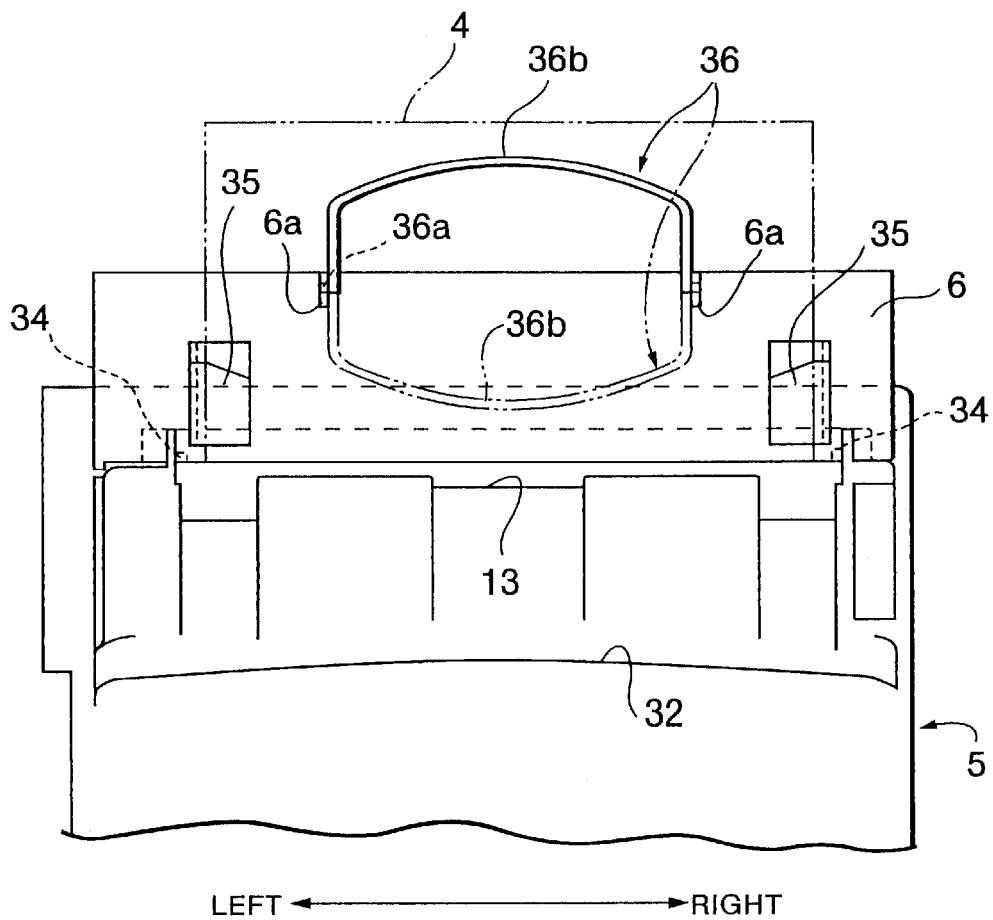
FIG. 2 is a plan view taken along a line II—II of FIG. 1, showing a sheet-supply tray of the facsimile machine in an open condition.
Figure 3:
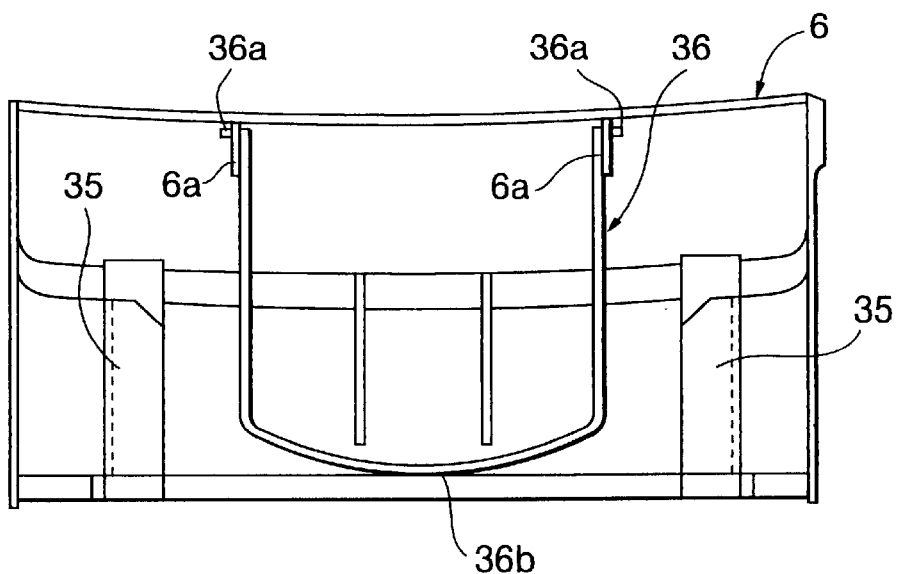
FIG. 3 is a plan view showing an extension hopper of the sheet-supply tray in a folded condition with respect to the sheet-supply tray.

The extended posture of the extension hopper 36 is indicated by a solid line in FIG. 2. To put the extension hopper 36 into its extended posture, the extension hopper 36 is pivoted to separate a front tip 36b of the cross-bar from the inner surface of the sheet-supply tray 6, until the extension hopper 36 protrudes away from the sheet-supply tray 6. At this point, the front tip 36b is maximally separated from the free edge of the sheet-supply tray 6 and also from the sheet-supply port 13. Also, as can be seen in FIG. 1, the extension hopper 36 extends substantially following an elongated surface of the bed 44 of the sheet-supply tray 6.

Here, operations for opening and closing the sheet-supply tray 6 will be described. When the sheet-supply tray 6 is pivoted away from the upper case 5 into the upright posture shown in FIG. 1, the sheet-supply port 13 and the sheet-discharge port 32 on the upper surface of the upper case 5 are opened up. Next, the extension hopper 36 is pivoted into its extended posture so that the front tip 36b of the extension hopper 36 is extended maximally separated from the free edge of the sheet-supply tray 6. When recording sheets 4 are supported in a stacked condition on the upper surface of the sheet-supply tray 6, at this time the entire body of the recording sheets 4 is supported by the sheet-supply tray 6 and the extension hopper 36. Therefore, long recording sheets 4 can be stacked on the sheet-supply tray 6 for long periods of time without bending or creasing, even when the rear portion, that is, in the sheet-supply direction, of the recording sheets 4 sticks out beyond the free edge of the sheet-supply tray 6.

Before closing the sheet-supply tray 6 to cover the sheet-supply port 13 and the sheet-discharge port 32, the extension hopper 36 needs to be pivoted into its folded up condition. At this time, the extension hopper 36 is pivoted so that the front tip 36b approaches the inner surface of the sheet-supply tray 6. When the front tip 36b of the extension hopper 36 is positioned at the inner surface of the sheet-supply tray 6, the extension hopper 36 will not get in the way when the sheet-supply tray 6 is pivoted closed.

Figure 7:
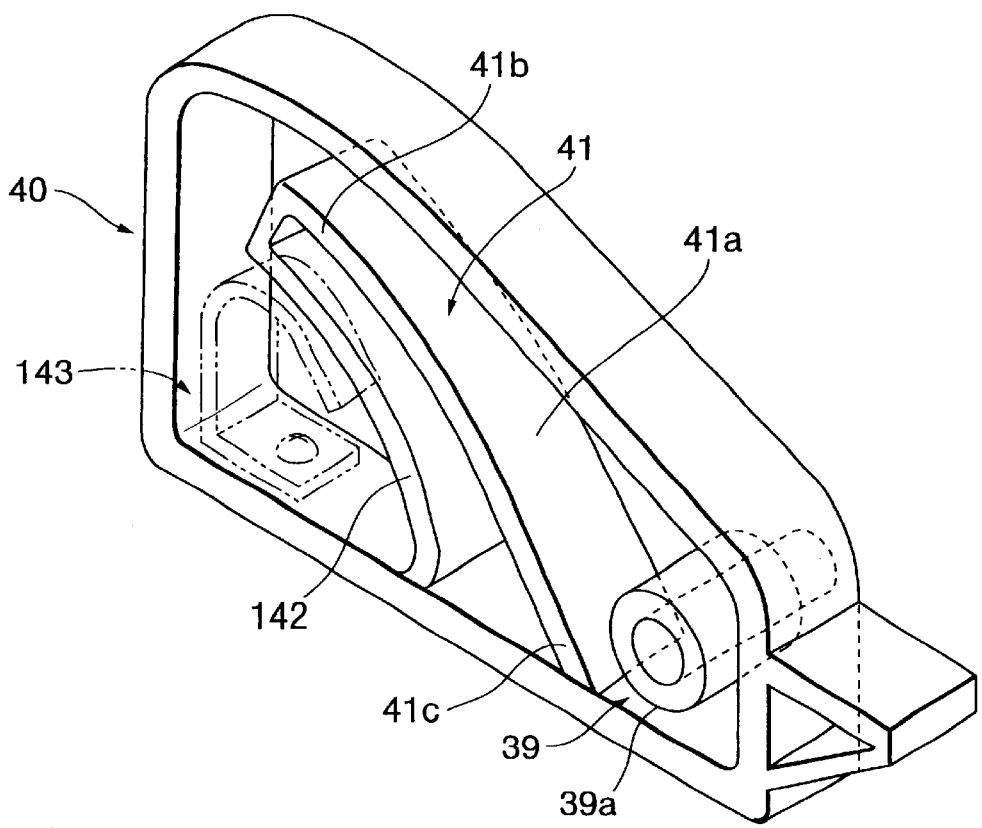
FIG. 7 is a perspective view showing a hollow frame of the printer.
Figure 8:
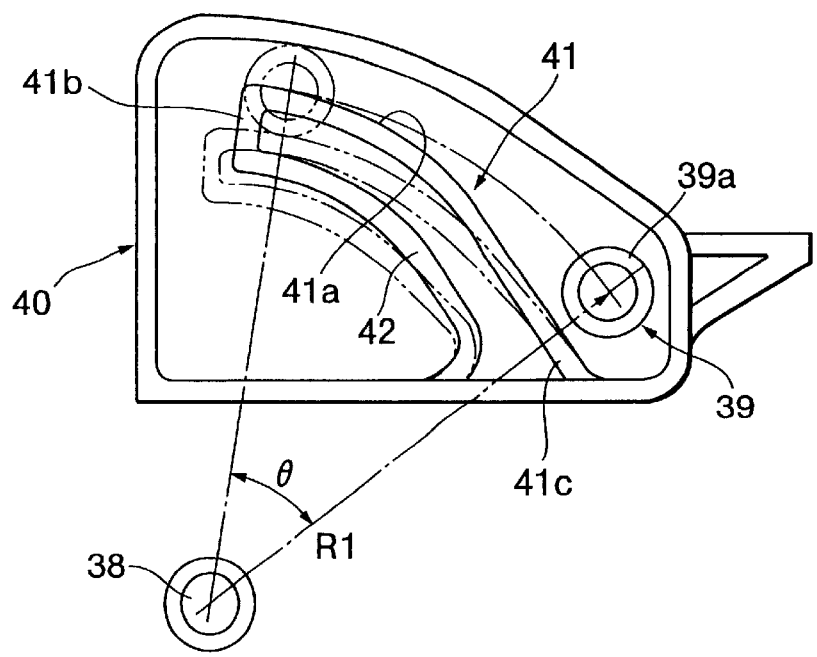
FIG. 8 is a side view showing positional relationship between the hollow frame and a pivot shaft of the cover.

Next, an explanation will be provided for configuration for opening and closing the upper case 5 while referring to FIGS. 4, 7, and 8. As shown in FIG. 4, a frame 37 is attached to the upper case 5. Although not shown in the drawings, there are actually two frames 37, that is, a left frame and a right frame. The sheet-supply roller 15 of the sheet-supply portion 14, the platen 20 of the print portion, the discharge pathway plate 30, and the discharge rollers 31 are attached between the frames 37. The rear edge of each frame 37 is mounted on the upper case 5 so as to pivot vertically around a shaft 38, which is attached to a rear edge of the lower case 2.

When the ink ribbon cartridge 24 needs to be replaced or when paper jams of the recording sheets 4 need to be corrected, the upper case 5 is pivoted in the direction indicated by an arrow A, from its closed condition indicated by the solid line in FIG. 4, to its opened condition indicated in the single-dot chain line in FIG. 4. A pin 39 and a resiliently deformable slide rib 41 are provided for maintaining the upper case 5 pivoted open to a wide angle, and for preventing the upper case 5 from unintentionally pivoting back in its closing direction. As will be described below, the pin 39 and the slide rib 41 are formed and positioned to abut against each other when the upper case 5 is in its opened condition and to be separated from each other when the upper case 5 is in its closed condition.

As shown in FIG. 4, the slide rib 41 is integrally formed with the inner surface of a hollow frame 40 fixed to the lower case 2 by a screw (not shown). It should be noted that the hollow frame 40 need not be fixed directly to the lower case 2, but could be fixed to any member that is fixed in place in a manner similar to the lower case 2.

The slide rib 41 and the hollow frame 40 are made from resin. As seem best in FIG. 7, the slide rib 41 includes a base 41c, an outwardly curving surface 41a, and a free end 41b. The base 41c is connected with one side of the hollow frame 40 and the free end 41b extends into the inner diameter portion of the slide rib 41.

The slide rib 41 is integrally connected with a reinforcement rib 142. Said differently, the slide rib 41 includes the curving surface 41a and the reinforcement rib 142. The reinforcement rib 142 has a diameter smaller than the diameter of the outwardly curving surface 41a. With this configuration, the slide rib 41 is sufficiently rigid to reduce bending amount of the free end of the slide rib 41.

As shown in FIG. 4, the outwardly curving surface 41a is eccentric with and intersects an imaginary circle IC. The imaginary circle IC is centered on the shaft 38, which defines an imaginary pivot line, and has a predetermined diameter with respect to the shaft 38. In other words, the curve of the outwardly curving surface 41a is centered on a point separated from the shaft 38. The outwardly curving surface 41a is formed and positioned so that when the upper case 5 is in its closed condition, so the pin 39 does not press against the slide rib 41, distance from the outwardly curving surface 41a to the shaft 38 decreases with increasing proximity to the base 41c and increases with increasing proximity to the free end 41b.

The pin 39 is provided to one of the frames 37 and extends horizontally in parallel with the imaginary pivot line defined by the shaft 38. It should be noted that the pin 39 need not be attached to one of the frames 37, but could instead be attached directly to the upper case 5 or to any member that pivots in association with the upper case 5. The pin 39 is positioned on the imaginary circle IC and follows an arc of the imaginary circle IC when the upper case 5 is pivoted open or closed.

When the upper case is in its closed condition, the pin 39 is located near, but separated from, the base 41c of the slide rib 41 and so does not press against the slide rib 41 as indicated in solid line in FIG. 8. However, in accordance with opening up of the upper case 5, the pin 39 follows a path along the imaginary circle IC that, as indicated by single dot chain line in FIG. 8, approaches the outwardly curving surface 41a. Because the imaginary circle IC and the outwardly curving surface 41a intersect each other, the lower peripheral surface of the pin 39 pressingly slides downward along the outwardly curving surface 41a. As the pin 39 traveling towards the free end of the slide rib 41 as indicated in double-dot chain line in FIG. 8, resilient resistance force by bending the slide rib 41 increases against the pin 39. The pin 39 will be wedged firmly against the slide rib 41 once the pin 39 has traveled the arc defined by angle θ.

As mentioned above, the pin 39 is provided to the frames 37 at a position where it does not abut against the slide rib 41 when the upper case 5 covers the upper surface of the lower case 2. When the upper case 5 is pivoted in the direction indicated by the arrow A of FIG. 4 to open up, the pin 39 slidingly presses the outwardly curving surface 41a of the slide rib 41. In accordance with movement of the pin 39 toward the free end of the slide rib 41, that is, in accordance with increasing opening angle of the upper case 5, the slide rib 41 will bend by an increasing amount so that slide resistance force against the pin 39 increases. Therefore, the upper case 5 can be maintained at a position where it is greatly opened. Even if the user takes his hand away from the upper case 5, the upper case 5 will not rapidly close by its self-weight so that the facsimile device 1 is safer.

Because the pin 39 is formed from metal or synthetic resin, it is desirable that a covering member 39a formed from rubber or other material with high friction coefficient be fitted around the outer surface of the pin 39. With this configuration, the pin 39 can be easily stopped at a desired position along the outwardly curving surface 41a by the pin 39 slidingly pressing against the slide rib 41 while bending the slide rib 41.

A reinforcement member 143 can be provided as indicated by a two-dot chain line of FIG. 7. The reinforcement member 143 is formed from, for example, a curved plate spring, with the curved portion facing the free end 41b of the slide rib 41. Although, FIG. 7 shows the reinforcement member 143 fixed to the inner surface of the hollow frame 40, the reinforcement member 143 could instead be formed to the lower surface of the slide rib 41. Alternatively, the hollow frame 40 and the slide rib 41 can be slightly redesigned so that the slide rib 41 abuts against the hollow frame 40 at an appropriate position. Any of these configurations increases the resistance to sliding between the slide rib 41 and the pin 39 when the upper case 5 is open to a certain desired position. As a result, the upper case 5 can be maintained in that posture more reliably.

According to the present embodiment, because the hollow frame 40 and the slide rib 41 are formed integrally together, rigidity of the slide rib 41 is increased. Also, pivot orbit of the pin 39 is restricted within the hollow frame 40. With this configuration, objects can be easily prevented from being sandwiched between the slide rib 41 and the pin 39. However, the hollow frame 40 is not a necessary component for achieving the beneficial effects of the present invention.

Figure 9:
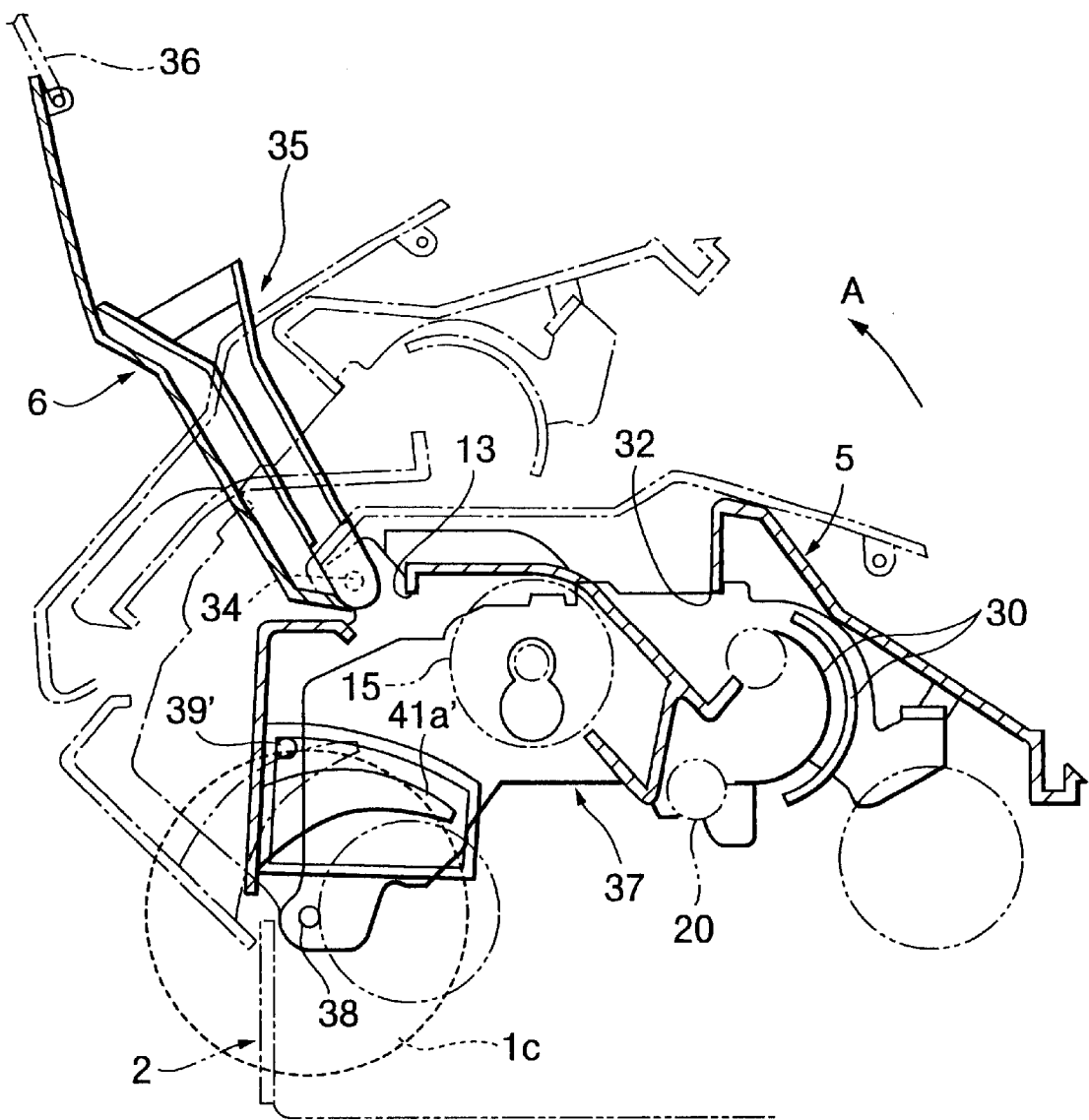
FIG. 9 is a cross-sectional view showing a laser printer according to a modification of the embodiment.

Also, according to the present embodiment, the pin 39 is provided to a pivotable component, that is, one of the pivotable frames 37, and the slide rib 41 is provided to a fixed component, that is, the lower case 2. However, as shown in FIG. 9, the pin 39 can be provided to a fixed component, such as the frame 2, and the slide rib 41 can be provided to a pivoting component, such as the upper case 1 itself or the pivotable frames 37. In this case, the fixed component could be any component that is fixed in place in the manner of the lower case 1. Similarly, the pivotable component could be any component that pivots with respect to the fixed component. Also, the slide rib 41 can be provided in the hollow frame 40 or directly attached to the fixed component. With any of these configurations, the same beneficial effects of the present invention can be achieved.

What is claimed is:

1. A mechanism provided to a fixed member and to a pivotable member, the pivotable member being pivotably attached to the fixed member so as to be pivotable about an imaginary pivot line with respect to the fixed member, the mechanism comprising:

a pin provided to one of the fixed member and the pivotable member, the pin protruding in a direction substantially parallel with the imaginary pivot line and being axially centered on an imaginary circle that is centered on the imaginary pivot line; and a resiliently deformable slide rib provided to another of the fixed member and the pivotable member, the slide rib having an outwardly-curved surface eccentric with the imaginary circle, a one of the slide rib and the pin that is provided to the pivotable member following the imaginary circle when the pivotable member is pivoted open away from the fixed member, so that the outwardly-curved surface and the pin pressingly slide against each other.

2. A mechanism as claimed in claim 1, wherein the slide rib has a fixed end and a free end on opposite sides of the outwardly-curved surface, the outwardly-curved surface sloping further away from the imaginary pivot line with increasing proximity to the free end.

3. A mechanism as claimed in claim 2, wherein the fixed end of the slide rib is formed integrally with an inner diameter portion of a resin hollow frame.

4. A mechanism as claimed in claim 3, wherein:

the imaginary pivot line extends in a horizontal direction;

the pin is provided to protrude from the pivotable member; and the hollow tube frame with the slide rib is fixed to the fixed member.

5. A mechanism as claimed in claim 1, wherein the fixed end of the slide rib is formed integrally with an inner diameter portion of a resin hollow frame.

6. A mechanism as claimed in claim 5, wherein:

the imaginary pivot line extends in a horizontal direction;

the pin is provided to protrude from the pivotable member; and the hollow tube frame with the slide rib is fixed to the fixed member.

7. A device that uses sheets, the device comprising:

a lower case;

an upper case pivotably attached to the lower case so as to be pivotable about an imaginary pivot line with respect to the lower case, the upper case being formed with a sheet-supply port and a sheet-discharge port extending substantially in parallel with each other;

a pin provided to one of the lower case and the upper case, the pin protruding in a direction substantially parallel with the imaginary pivot line and being axially centered on an imaginary circle that is centered on the imaginary pivot line;

a resiliently deformable slide rib provided to another of the lower case and the upper case, the slide rib having an outwardly-curved surface eccentric with the imaginary circle, a one of the slide rib and the pin that is provided to the upper case following the imaginary circle when the upper case is pivoted open, so that the outwardly-curved surface and the pin pressingly slide against each other; and a sheet-supply tray disposed on the upper case at a position to sandwich the sheet-supply port between the sheet-supply tray and the sheet-discharge port, the sheet-supply tray having:

an upper surface slanting downward toward the sheet-supply port;

a pair of guides for guiding sheets stacked on the upper surface toward the sheet-supply port; and a pair of separation ribs provided one to each of the guides, the separation ribs together defining therebelow a sheet-supply pathway and thereabove a sheet-discharge pathway.

* * * * *